(12) United States Patent
Gawade et al.

(10) Patent No.: US 11,316,822 B1
(45) Date of Patent: Apr. 26, 2022

(54) ALLOCATING EXTERNAL IP ADDRESSES FROM ISOLATED POOLS

(71) Applicant: Juniper Networks, Inc., Sunnyvale, CA (US)

(72) Inventors: Aniket J. Gawade, Fremont, CA (US); Sachchidanand Vaidya, Santa Clara, CA (US); Yuvaraja Mariappan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 96 days.

(21) Appl. No.: 16/145,609

(22) Filed: Sep. 28, 2018

(51) Int. Cl.
| | | |
|---|---|---|
| H04L 29/12 | (2006.01) | |
| G06F 11/20 | (2006.01) | |
| G06F 9/455 | (2018.01) | |
| H04L 61/5084 | (2022.01) | |
| H04L 61/5061 | (2022.01) | |

(52) U.S. Cl.
CPC ...... *H04L 61/2084* (2013.01); *G06F 9/45558* (2013.01); *G06F 11/2025* (2013.01); *H04L 61/2061* (2013.01); *G06F 2009/45595* (2013.01); *G06F 2201/815* (2013.01)

(58) Field of Classification Search
CPC ............. H04L 61/2084; H04L 61/2061; G06F 9/45558; G06F 11/2025
USPC .......................................... 709/245–247, 217
See application file for complete search history.

(56) References Cited

U.S. PATENT DOCUMENTS

| | | |
|---|---|---|
| 9,276,816 B1 | 3/2016 | Conte et al. |
| 9,479,457 B2 | 10/2016 | Sindhu |
| 9,571,394 B1 | 2/2017 | Sivaramakrishnan et al. |
| 9,692,729 B1 * | 6/2017 | Chen .................... H04L 41/0813 |
| 10,013,189 B1 | 7/2018 | Yang et al. |
| 10,025,924 B1 | 7/2018 | Vagin et al. |
| 10,146,936 B1 | 12/2018 | Khanduja |
| 10,191,778 B1 | 1/2019 | Yang et al. |
| 10,362,092 B1 * | 7/2019 | Parthasarathy ......... H04L 67/06 |
| 10,423,493 B1 | 9/2019 | Vig et al. |
| 10,616,072 B1 | 4/2020 | Lo et al. |
| 10,791,144 B1 | 9/2020 | Golan et al. |
| 10,805,181 B2 | 10/2020 | Boutros et al. |

(Continued)

FOREIGN PATENT DOCUMENTS

WO    2013184846 A1    12/2013

OTHER PUBLICATIONS

Marmol, Victor, Rohit Jnagal, and Tim Hockin. "Networking in containers and container clusters." In Proceedings of netdev 0.1. 2015. (Year: 2015).*

(Continued)

*Primary Examiner* — Suraj M Joshi
*Assistant Examiner* — Melaku Y Habtemariam
(74) *Attorney, Agent, or Firm* — Shumaker & Sieffert, P.A.

(57) ABSTRACT

Techniques are described for creating isolated pools of external, failover, and/or floating IP addresses. In one example, this disclosure describes a method including creating a plurality of virtual networks, creating a plurality of pools of external IP addresses, detecting a request to instantiate an object that identifies a specific pool from the plurality of pools of external IP addresses; and instantiating the object and configuring the object with an external IP address drawn from the specific pool. The pools of external IP addresses may be created and isolated on a per-namespace, per-service, or per-ingress basis.

16 Claims, 7 Drawing Sheets

(56) References Cited

U.S. PATENT DOCUMENTS

| | | | |
|---|---|---|---|
| 2008/0151893 A1 | 6/2008 | Nordmark et al. | |
| 2012/0042054 A1 | 2/2012 | Kotha et al. | |
| 2013/0332577 A1* | 12/2013 | Nakil | H04L 41/0659 709/219 |
| 2015/0370586 A1 | 12/2015 | Cooper et al. | |
| 2015/0372935 A1* | 12/2015 | Kervik | H04L 67/1097 709/226 |
| 2016/0105393 A1 | 4/2016 | Thakkar et al. | |
| 2016/0182279 A1 | 6/2016 | Gong et al. | |
| 2017/0041288 A1 | 2/2017 | Stotski et al. | |
| 2017/0244593 A1 | 8/2017 | Rangasamy et al. | |
| 2017/0373940 A1* | 12/2017 | Shahab | H04L 47/70 |
| 2018/0084084 A1* | 3/2018 | Sharma | H04L 41/082 |
| 2018/0139174 A1* | 5/2018 | Thakkar | H04L 61/2061 |
| 2018/0159729 A1* | 6/2018 | Deshmukh | H04L 61/1511 |
| 2019/0065323 A1* | 2/2019 | Dhamdhere | G06F 11/1484 |
| 2019/0392150 A1* | 12/2019 | Shevade | H04L 61/2015 |

OTHER PUBLICATIONS

Chang, Chia-Chen, Shun-Ren Yang, En-Hau Yeh, Phone Lin, and Jeu-Yih Jeng. "A kubernetes-based monitoring platform for dynamic cloud resource provisioning." In GLOBECOM 2017-2017 IEEE Global Communications Conference, pp. 1-6. IEEE, 2017. (Year: 2017).*

U.S. Appl. No. 16/145,586, by Juniper Networks, Inc., (Inventors: Gawade et al.), filed Sep. 28, 2018.

"Juniper/Contrail-Specs/kubernetes-5.0.md" GitHub, Apr. 26, 2018, available at https://github.com/Juniper/contrail-specs/blob/master/kubernetes-5.0.md (last accessed Sep. 26, 2018), 3 pp.

"Services, Load Balancing, and Networking—Kubernetes", The Kubemetes Authors, available at https://kubemetes.io/docs/concepts/services-networking/ (last accessed Sep. 26, 2018), May 5, 2018, 19 pp.

"PCI-SIG SR-IOV Primer: An Introduction to SR-IOV Technology," Rev. 2.5, Intel Corp., Jan. 2011, 28 pp.

Mackie et al., "BGP-Signaled End-System IP/VPNs," draft-ietf-l3vpn-end-system-06, Dec. 15, 2016, 31 pp.

Rosen et al. "BGP/MPLS IP Virtual Private Networks (VPNs)," Request for Comments 4364, Internet Engineering Task Force Network Working Group, Feb. 2006, 47 pp.

Singla et al. "OpenContrail Architecture Document" Architecture Documentation, Nov. 20, 2013, 42 pp.

U.S. Appl. No. 16/118,107, filed Aug. 30, 2018, Juniper Networks, Inc. (inventor: Rao et al.) entitled "Multiple Virtual Network Interface Support for Virtual Execution Elements,".

* cited by examiner

ALLOCATING EXTERNAL IP ADDRESSES FROM ISOLATED POOLS

TECHNICAL FIELD

The disclosure relates to a virtualized computing infrastructure and, more specifically, to floating IP addresses used in a virtualized computing infrastructure within data centers.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A floating IP address is, in some contexts, a type of external address used to support failover in high-availability clusters. Often, a cluster is configured such that a service is made available at a particular externally-available IP address. Typically, a virtual execution environment (e.g., a container) is configured to respond to service requests at that IP address. Should the virtual execution environment responding to the IP address fail, responsibility for responding to service requests at the IP address is transferred to a standby execution environment. The transfer to the standby execution environment may often take place very quickly, with little to no downtime. Thereafter, that standby execution environment responds to subsequent service requests sent to the IP address. In this example, an IP address capable of being transferred to the standby execution environment in the manner described may be considered a failover IP address, a floating IP address, or simply an external IP address.

SUMMARY

This disclosure describes techniques that include allocating one or more isolated pools of external IP addresses. In some examples, such external IP addresses or pools of external IP addresses are isolated from other address pools, network objects or constructs. For instance, techniques are described for creating isolated pools of external IP addresses on a per-object basis, where objects may include namespaces, services, and/or ingresses, for example. In such examples, external IP addresses drawn from an isolated pool associated with one object are within a range of addresses that is exclusive to that object, and are addresses not accessible to other objects. In some examples, such pools of external IP addresses may be pools of IP addresses used to support failover scenarios or, alternatively, pools of floating IP addresses The techniques described herein may provide one or more technical advantages. For example, the techniques described herein may enable tenant isolation in a multitenant data center that provides computing infrastructure to multiple tenants or customers. As another example, techniques described herein may also enable namespace isolation where a tenant might be associated with multiple namespaces, or even where a namespace might be associated with multiple tenants. As another example, techniques described herein may enable a service, such as a Kubernetes service, to obtain addresses for two different networks, in order to appropriately configure and implement isolated services (e.g., Kubernetes services), in a multitenant data center, that employ failover or floating IP addresses as external IP addresses. And as another example, techniques described herein may enable tenant isolation for ingress implementations (e.g., Kubernetes layer 7 load balancing implementations) that use external IP addresses.

In one example, this disclosure describes a method comprising creating, by a controller, in a virtualized computing infrastructure, a plurality of objects, wherein each of the objects is isolated from other objects to prevent access by any other object of the objects, and wherein each of the objects includes one or more pods of one or more containers; creating, by the controller, a plurality of pools of external IP addresses, each of the plurality of pools of external IP addresses being associated with a different object of the objects, wherein each pool of external IP addresses includes a range of addresses that are exclusive to the associated object; configuring, by the controller, a specific object of the objects with an external IP address drawn from a pool of external IP addresses associated with the specific object, wherein the external IP address is associated with a service external IP address.

In another example, this disclosure describes a method comprising creating, by a controller, a plurality of virtual networks, each of the plurality of virtual networks being associated with a different one of a plurality of tenants in a multitenant virtualized data center, and wherein each of the plurality of virtual networks is isolated from other virtual networks to prevent access by any other tenant of the plurality of tenants in the multitenant virtualized data center; creating, by the controller, a plurality of pools of external IP addresses, each of the plurality of pools of external IP addresses being associated with a different one of the plurality of tenants, and wherein each of the external IP addresses within each pool of external IP addresses falls within a range of addresses that are exclusive to the tenant associated with that pool of external IP addresses; detecting, by the controller, a request to instantiate an object, wherein the request identifies a specific pool from the plurality of pools of external IP addresses; and instantiating, by the controller, the object and configuring the object with an external IP address drawn from the specific pool.

In another example, this disclosure describes a system comprising a storage device; and processing circuitry having access to the storage device, wherein the processing circuitry is configured to: create, in a virtualized computing infrastructure, a plurality of namespaces, wherein each of the namespaces is isolated from other namespaces to prevent access by any other of the plurality of namespaces, and wherein each of the namespaces includes one or more pods of one or more containers; create a plurality of pools of external IP addresses, each of the pools of external IP addresses within the plurality of pools being associated with a different namespace of the plurality of namespaces, and each including a range of addresses that are exclusive to the associated namespace; create an object within one of the namespaces of the plurality of namespaces, wherein the object is isolated from objects in other namespaces to prevent access by the objects in the other namespaces; create an additional pool of external IP addresses, wherein the additional pool of external IP addresses is associated with the object and includes a range of addresses that are exclusive to the object; and configure the object with an external IP address drawn from the additional pool of external IP addresses.

DETAILED DESCRIPTION

Figure 1A:
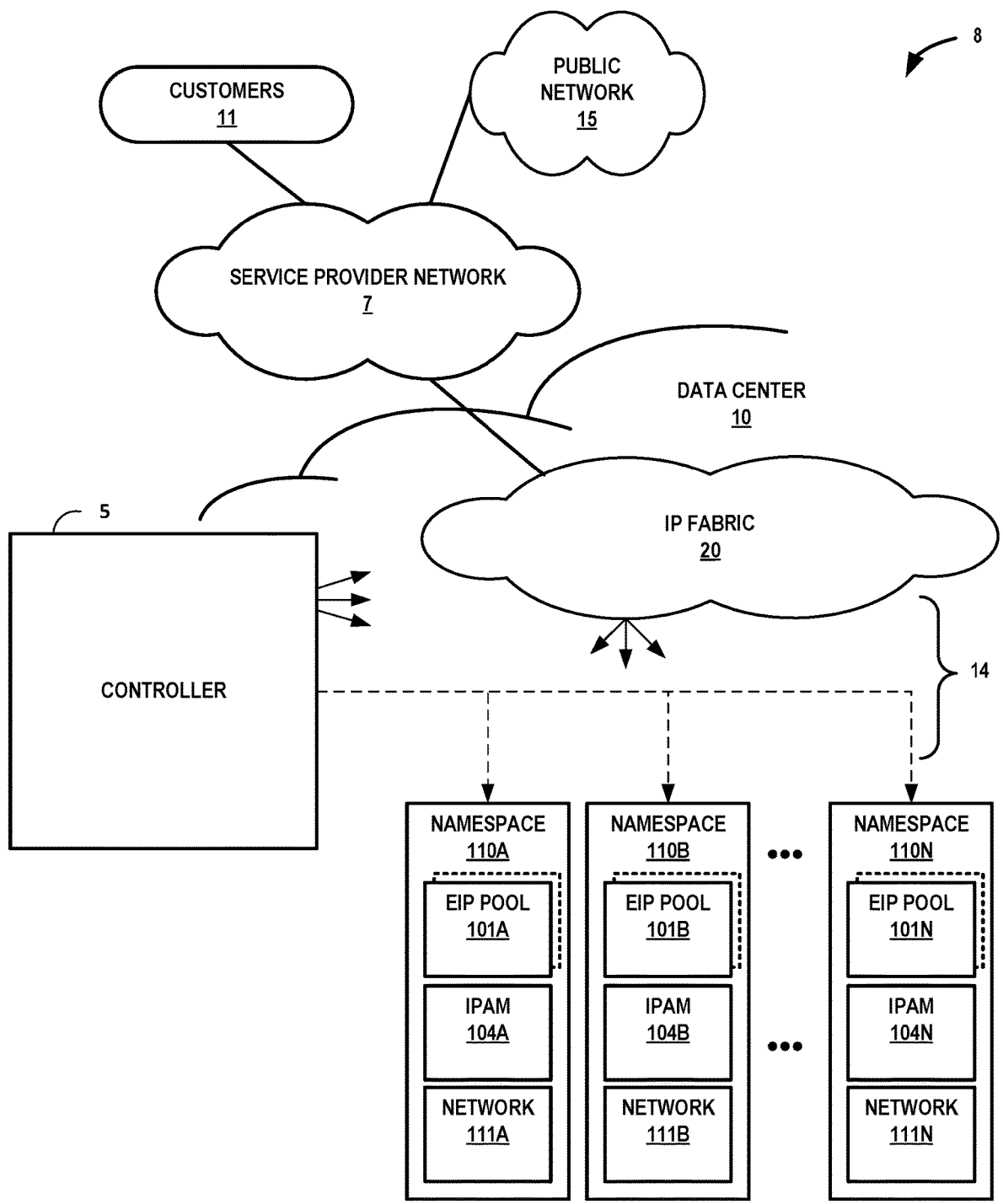
FIG. 1A is a block diagram illustrating an example computing infrastructure in which examples of the techniques described herein may be implemented.

FIG. 1A is a block diagram illustrating an example computing infrastructure 8 in which examples of the techniques described herein may be implemented. In general, data center 10 includes IP fabric 20 and provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1A, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

FIG. 1A further includes controller 5 and namespaces 110 (corresponding to namespace 110A through 110N, and representing any number of namespaces). In some examples, each of namespaces 110 is associated with and/or defined for a specific tenant (which may correspond to a data center customer) utilizing computing infrastructure within data center 10. In such examples, tenants or customers associated with each of namespaces 110A through 110N may be referenced as "customers A through N," respectively. Each of namespaces 110 may include one or more external or floating IP address pools 101, one or more IPAMs 104, and one or more networks 111. For example, namespace 110A includes external IP address pool 101A ("EIP 101A"), IPAM 104A, and network 111A. And in general, namespace 110N includes external IP address pool 101N ("EIP 101N"), IPAM 104N, and network 111N. In general, namespaces provides different name scopes for groups of virtual execution elements executed by a computing infrastructure. In general, namespaces are a way to divide cluster resources among multiple tenants.

Each of networks 111 within namespaces 110 may, in some examples, be based on an underlay network and an overlay network. For instance, the physical underlay network associated with network 111A may be made up of IP fabric 20 and/or switching fabric 14, and may serve as fabric providing unicast IP connectivity from any physical device (server, storage device, router, or switch) to any other physical device. The overlay network associated with network 111A may be created by virtual routers running in the kernels or hypervisors of virtualized servers within servers included within data center 10 (e.g., servers included within or associated with namespaces 110). Such servers may create a virtual overlay network on top of the physical underlay network using a mesh of dynamic "tunnels" amongst themselves.

Controller 5 serves as a network controller and orchestrator for data center 10. Controller 5 may implement and/or control nodes for one or more clusters that include servers that implement namespaces 110 to provide isolation. In general, controller 5 may control the network configuration of the data center 10 fabric and the servers to, e.g., establish one or more virtual networks for packetized communications among virtual network endpoints, and provide a logically and in some cases physically centralized controller for facilitating operation of one or more virtual networks within data center 10. Controller 5 may also control the deployment, scaling, and operations of virtual execution elements across clusters of servers that implement namespaces 110 (or data center 10 generally) and providing computing infrastructure, which may include container-centric computing infrastructure. In some examples, controller 5 may operate in response to configuration input received from an administrator or from another device included within or outside data center 10. Devices that implement namespaces 110 may be coupled to IP fabric 20, which may perform layer 3 routing to route network traffic between data center 10 and customer sites 11 by service provider network 7.

In the example of FIG. 1A, and in accordance with one or more aspects of the present disclosure, controller 5 may establish isolation, which may include network isolation, for groups of virtual execution elements, executing on the servers, using namespaces 110A-110N. For instance, in the example of FIG. 1A, controller 5 establishes namespaces 110A through 110N. Controller 5 establishes isolation for each namespace 110 by configuring data center 10 such that objects (e.g., networks) within each of namespaces 110 are not accessible from other namespaces (as further described below), unless security or network policies are otherwise defined to allow access. In some examples, a data center tenant may be considered a customer, and each customer may be associated with a namespace.

When creating each of namespaces 110, controller 5 may create a default network for the namespace. For instance, in the example of FIG. 1A, controller 5 creates default network 111A by establishing a virtual network based on an underlay network and an overlay network. When creating default network 111A, controller 5 may create one or more IPAMs 104A, for use in connection with default network 111A. One or more IPAMs 104 may represent modules or executable code, executing on controller 5, that plan, allocate, and/or manage IP addresses used within each of the virtual networks created by controller 5. Similarly, controller 5 creates default network 111B through default network 111N, associated with respective namespaces 110, and each having one or more IPAMs 104.

Controller 5 may establish an external or floating IP address pool for each of namespaces 110. For instance, when configuring and/or establishing namespace 110A, controller 5 creates external IP address pool 101A, which is a pool of addresses from which IP addresses are drawn for the purpose of serving as external, failover, or floating IP addresses. In some examples, controller 5 creates external IP address pool 101A automatically when creating network 111A and/or namespace 110A. In other examples, controller 5 creates external IP address pool 101A or associates external IP address pool 101A to namespace 110A based on input by an authorized user associated with a tenant. When default network 111A or other objects within namespace 110A request or otherwise have a need for a floating or external IP address, an IP address is drawn from external IP address pool 101A for use for the object. In some examples, all objects (e.g., services) spawned within each namespace will be assigned an IP address consistent with the parameters and/or specification of the IPAM 104 associated with that namespace, and for floating and/or external IP addresses, such addresses will be drawn from the external IP address pool 101 associated with that namespace. For each of namespaces 110B through 110N, controller 5 establishes separate external IP address pools 101 (e.g., pools 101B through 101N), each associated with a respective customer and/or namespace. Each of external IP address pools 101 may be used for assigning external IP addresses to objects created or spawned within each respective namespace.

Controller 5 may also create one or more additional external IP address pools 101 for a namespace. For instance, again referring to FIG. 1A, controller 5 detects input that it determines corresponds to a request to establish an additional external IP address pool. Controller 5 accesses IPAM 104A, and uses IPAM 104A to generate one or more additional external IP address pools (depicted by the dotted line behind external IP address pool 101A in FIG. 1A).

Controller 5 may also create, in a similar manner, one or more additional external IP address pools 101 in response to input by users. In some examples, the input may be associated with an authorized user of a tenant or customer.

Figure 1B:
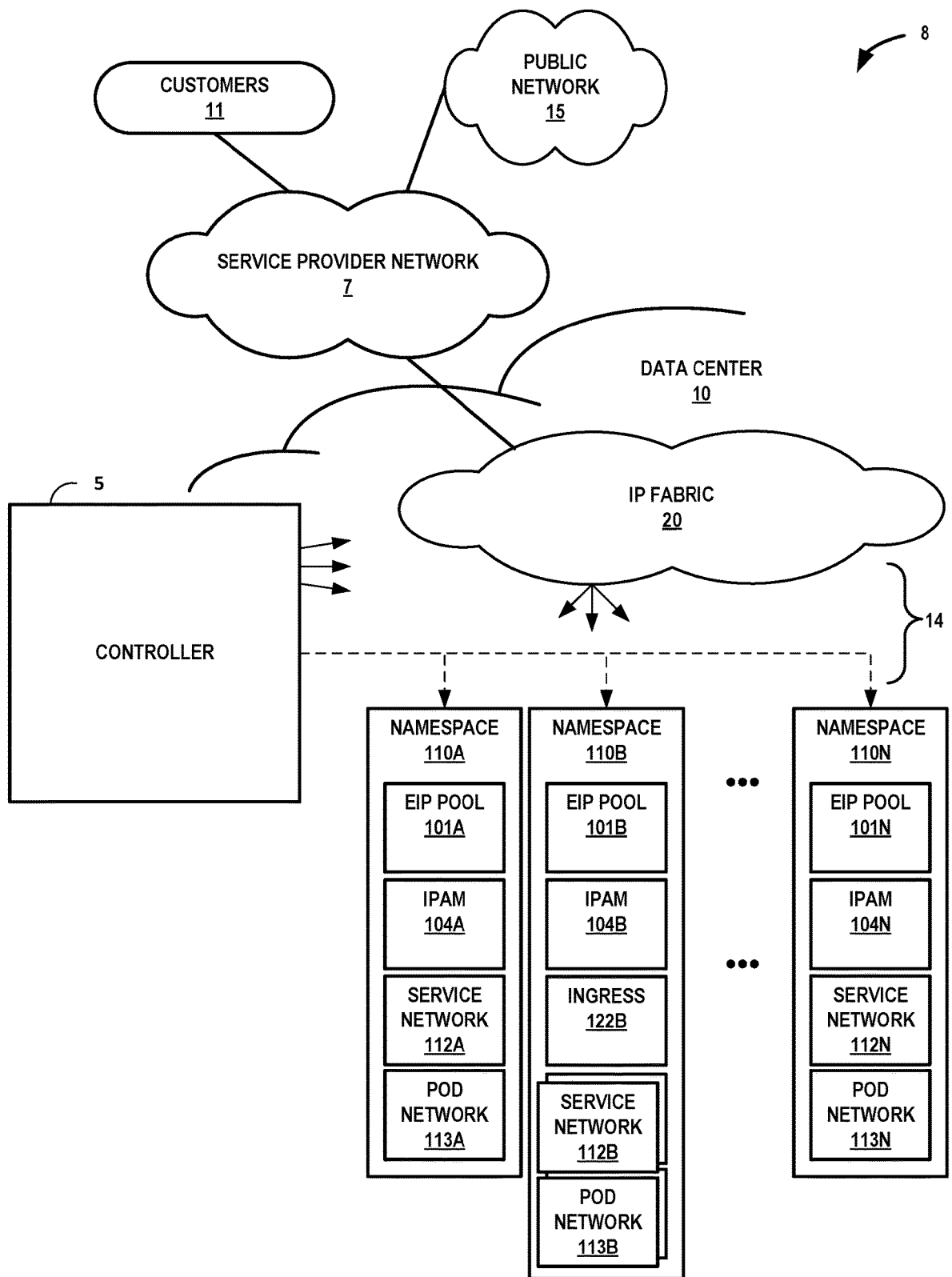
FIG. 1B is a block diagram illustrating an example infrastructure in which examples of the techniques described herein may be implemented using the Kubernetes platform.

FIG. 1B is a block diagram illustrating an example infrastructure in which examples of the techniques described herein may be implemented on the Kubernetes platform. Kubernetes is a container orchestration system for automating deployment, scaling, and management of containerized applications. Kubernetes may provide portability across public and private clouds, each of which may provide virtualization infrastructure to the container management platform.

Infrastructure 8 of FIG. 1B may be described as an example or alternative implementation of infrastructure 8 of FIG. 1A, illustrated in a Kubernetes context. In the example of FIG. 1B, infrastructure 8 includes many of the same elements described in connection with FIG. 1A, and elements illustrated in FIG. 1B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A, although in some examples, such elements may involve alternative implementation with more, fewer, and/or different capabilities and attributes. For instance, as in FIG. 1A, controller 5 of FIG. 1B controls deployment, scaling, and/or operations of virtual execution elements across clusters of servers providing computing infrastructure. However, controller 5 of FIG. 1B may implement respective cluster masters for one or more Kubernetes clusters. Similarly, virtual execution elements within FIG. 1B (not specifically shown) may be deployed to a virtualization environment using a cluster-based framework in which controller 5, acting as a cluster master, manages the deployment and operation of containers to one or more cluster minion nodes within each of namespaces 110. The Kubernetes terms "master node" and "minion node" may distinguish between primarily management elements of a cluster ("master") and primarily virtual execution element hosting devices ("minion") of a cluster.

Kubernetes operates using a variety of "objects"—entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a virtual execution element that belongs to a particular namespace has the ability to access each virtual network of the virtual networks that is associated with the namespace, including other virtual execution elements that serve as virtual network endpoints of the group of virtual networks.

In FIG. 1B, each of namespaces 110 implements one or more Kubernetes services. In some instances, the way Kubernetes implements a service corresponds in some respects to a load balancing system. Such a system exposes an address for the service, and that address is supported by a number of pods. Typically, there are two sets of allocated IP addresses for a given Kubernetes cluster: (1) a pod set of IP addresses and (2) a set of IP addresses defined for the external service address. In some examples, these sets of IP addresses correspond to a classless inter-domain routing (CIDR) method of allocating addresses. In the example of FIG. 1B, each of these CIDRs are separated into distinct networks within a namespace, so that namespace 110A includes both service network 112A and pod network 113A. The Kubernetes service implemented within namespace 110A (implemented by service network 112A and pod network 113A) is thus isolated from other customers and namespaces 110. Service network 112A may include one or more pods to delegate service requests, and pod network 113A may include one or more pods to implement one or more services corresponding to the service requests. In a typical use case, when a front-end pod wants to access a service implemented by pod network 113A, that front-end pod will interact with the external IP address exposed by service network 112A, and generally will not interact directly with any of the computing resources (e.g., containers) within pod network 113A. Service chaining implementations therefore may be accessed through the IP address exposed by service network 112A.

In the example of FIG. 1B, one or more namespaces 110 may implement an ingress service (e.g., a Kubernetes ingress) to support multiple services. For instance, in FIG. 1B, namespace 110B implements ingress 122B, which may be a collection of rules that allow inbound connections to reach cluster services. In some examples, ingress 122B may be configured to give services externally-reachable URLs, or to load balance traffic, terminate SSL connections, or perform other services. Ingress 122B may be implemented through an ingress controller, fulfills ingress responsibilities, often with a layer 7 load balancing functions.

In the example of FIG. 1B, and in accordance with one or more aspects of the present disclosure, controller 5 may establish isolation using namespaces 110. Controller 5 further creates, for each of namespaces 110, external IP address pools 101 and IPAMs 104. Controller 5 establishes namespace isolation by configuring data center 10 such that objects and/or networks within each of namespaces 110 are not accessible from other namespaces. In some examples, namespace isolation may result in tenant and/or customer isolation.

Controller 5 may establish an external IP address pool for each of namespaces 110. For instance, when configuring and/or establishing namespace 110A, controller 5 creates external IP address pool 101A. As in FIG. 1A, when default network 111A or another objects within namespace 110A is to be configured with an external IP address, controller 5 draws an IP address from external IP address pool 101A for the object. In some examples, all objects (e.g., services) spawned within each namespace will be assigned an IP address consistent with the parameters of IPAM 104A, and for external IP addresses, such addresses will be drawn from external IP address pool 101A. For each of namespaces 110B through 110N, controller 5 establishes separate external IP address pools 101 and IPAMs 104, each associated with a respective customer and/or namespace. Accordingly, rather than sharing a pool of external IP addresses across namespaces 110, each of namespaces 110 in FIG. 1B is allocated one or more of its own isolated external IP address pools 101 (i.e., external IP address pool 101A through external IP address pool 101N, each included within a respective namespace 110A through namespace 110N). External IP addresses allocated within a given external IP address pool are therefore not accessible and/or are isolated from other namespaces 110.

Controller 5 may create a service within one or more namespaces 110. For instance, in the example of FIG. 1B, controller 5 detects input from a user. Controller 5 determines that the input corresponds to a request to create a service within namespace 110A. In response, controller 5 creates service network 112A and pod network 113A. Controller 5 determines that the input specifies that the IP address used for accessing service network 112A is to be drawn from external IP address pool 101A. In some examples, the input specifies external IP address pool 101A through use of an annotation. Controller 5 associates external IP address pool 101A with service network 112A and configures service network 112A with an IP address, for use as an external address for the service, that is drawn from external IP address pool 101A. Thereafter, one or more external IP addresses assigned to the service may be drawn from external IP address pool 101A. Service network 112A may be assigned its own address or set of addresses, which may be distinct from the external IP address assigned to the service.

Controller 5 may establish ingress 122B within one or more namespaces 110. For instance, in the example of FIG. 1B, controller 5 establishes multiple services within namespace 110B resulting in service networks 112B and pod networks 113B. Controller 5 may establish such services in the manner described above in connection with service network 112A and pod network 113A. Once the services are established, controller 5 may detect input from a user. Controller 5 determines that the input corresponds to a request to create ingress object 122B for the multiple services (each supported by a pair of networks corresponding to service networks 112B and pod networks 113B). Controller 5 further determines that the input specifies that the external IP address used for accessing each of service networks 112B through ingress 122B is to be drawn from previously-established external IP address pool 101B. In some examples, the input specifies, through use of an annotation, that external IP address pool 101B is to be used for ingress 122B. Controller 5 associates external IP address pool 101B with ingress 122B and configures ingress 122B with an IP address drawn from external IP address pool 101B. Ingress 122B uses an external IP address from namespace 110B, assigned to a virtual execution element, to respond to service requests. When that virtual execution element fails, ingress 122B continues to use the same external IP address to respond to service requests, but the external IP address is assigned to a new virtual execution element within namespace 110B pursuant to a failover process that transfers the external IP address from the failed virtual execution element to the new one.

Controller 5 may also create one or more additional external IP address pools 101. For instance, again referring to FIG. 1B, controller 5 detects input that it determines corresponds to a request to establish an additional external IP address pool. Controller 5 accesses an IPAM within namespace 110B (e.g., IPAM 104B), and uses the IPAM to generate one or more additional external IP address pools (depicted as a dotted line behind external IP address pool 101B in FIG. 1B). Controller 5 may thereafter associate or assign, in response to input, one or more objects (namespace, service, ingress) to an address drawn from one of the new external IP address pools 101B. In some examples, controller 5 may allocate external IP addresses from external IP address pools 101B in response to input that may be in the form of an annotation.

Figure 1C:
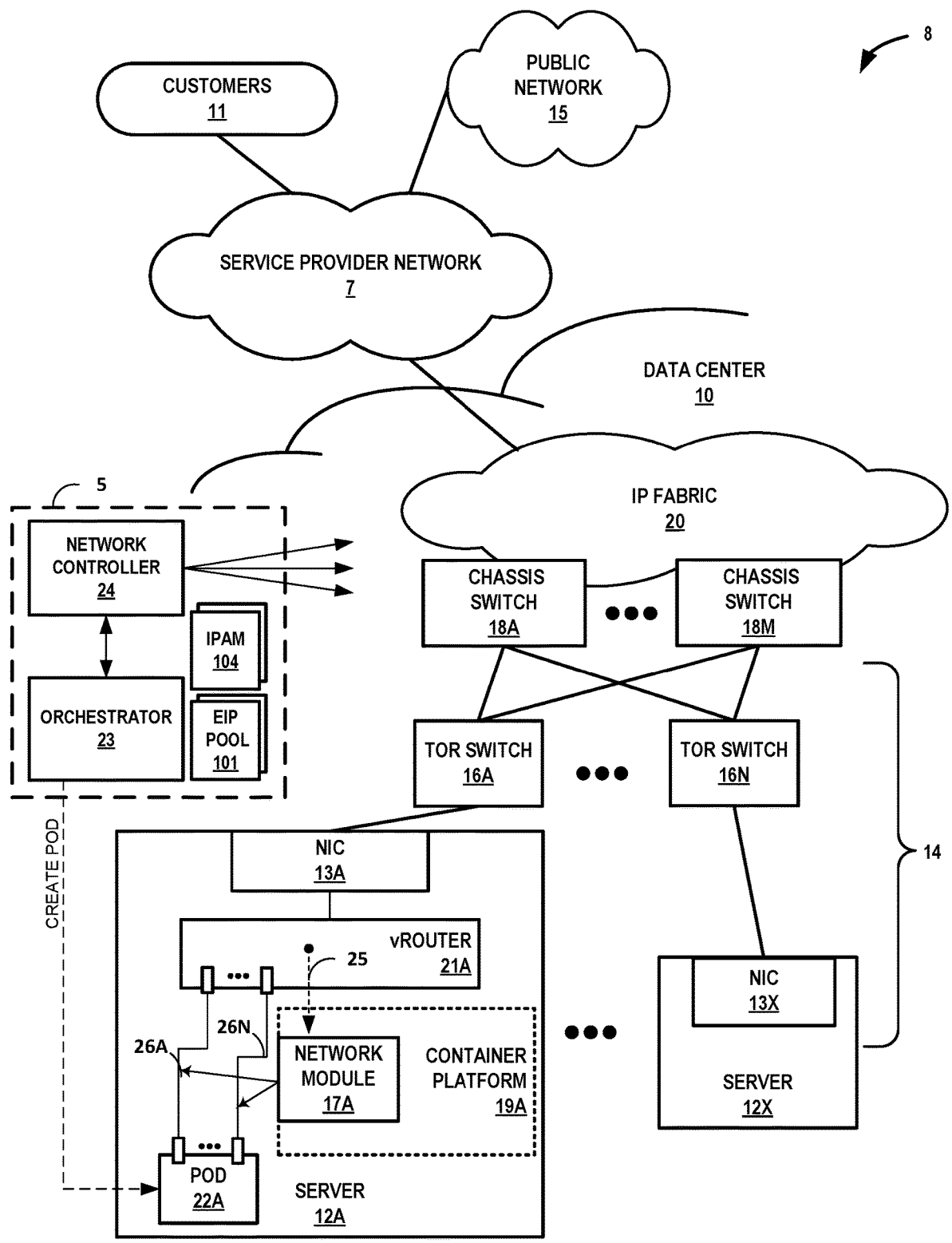
FIG. 1C is a block diagram illustrating an additional example infrastructure and data center, in accordance with one or more aspects of the present disclosure.

FIG. 1C is a block diagram illustrating an additional example infrastructure and data center, in accordance with one or more aspects of the present disclosure. Infrastructure 8 of FIG. 1C may be described as an example or alternative implementation of infrastructure 8 of FIG. 1A or 1B. In the example of FIG. 1C, infrastructure 8 includes many of the same elements described in earlier illustrations, and elements illustrated in FIG. 1C may correspond to earlier-illustrated elements that are identified by like-numbered reference numerals. In general, such like-numbered elements may be implemented in a manner consistent with the description of the corresponding element provided in connection with FIGS. 1A and/or 1B, although in some examples, such elements may involve alternative implementation with more, fewer, and/or different capabilities and attributes.

In the example of FIG. 1C, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide a fully or partially independent execution environment for applications. The term "virtual execution element" may also encompass a pod that includes one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each include at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-My Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), which may share the same namespace), and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

In the example of FIG. 1C, and in accordance with one or more aspects of the present disclosure, controller 5 may create one or more virtual networks within namespaces. For instance, in the example of FIG. 1C, orchestrator 23 of controller 5 detects input that it determines corresponds to data about one or more namespaces to establish within data center 10. In some examples, the data about the namespaces may be specified in a JSON or YAML format, and provided to orchestrator 23 of controller 5 in the form of administrator input or otherwise. Orchestrator 23 processes the data about the namespaces and generates configuration objects associated with each namespace, wherein the configuration objects include virtual network configuration objects for each virtual network associated with or to be associated with each namespace. In some examples, orchestrator 23 configures each namespace to represent a virtual cluster within a Kubernetes cluster. Orchestrator 23 outputs information about the namespace data to network controller 24. Network controller 24 deploys one or more servers 12 and creates one or more virtual networks within data center 10. When creating the virtual networks, network controller 24 may request various virtual network interfaces 26 for virtual execution elements being deployed in servers 12 to each respective namespace. In some examples, the virtual networks within data center 10 may be configured by network controller 24 independently of orchestrator 23. In such an example, orchestrator 23 may operate as a "pass through" stop for the data about the namespaces, yet orchestrator 23 may nevertheless be, in some examples, the architect of the virtual execution elements (e.g., pods, containers, virtual machines, or the like) instantiated as virtual network endpoints of the plurality of virtual networks.

Controller 5 may create an IP address management module (IPAM) for one or more of the virtual networks created within data center 10 of FIG. 1C. For instance, referring again to FIG. 1C, orchestrator 23 creates, for each of the virtual networks created within data center 10, IPAMs 104. Orchestrator 23 uses IPAMs 104 to plan, allocate, and manage IP addresses used within each of the virtual networks.

Controller 5 may create one or more external IP address pools 101. For instance, still referring to FIG. 1C, orchestrator 23 uses one or more of IPAMs 104 to create external IP address pools 101. In some examples, orchestrator 23 creates external IP address pools 101 for each respective namespace within data center 10. In other examples, orchestrator 23 creates external IP address pools 101 for each respective one or more services implemented by service and pod networks established by network controller 24 within data center 10. In other examples, orchestrator 23 creates external IP address pools 101 for other objects, such as, for example, Kubernetes ingress objects.

Further details relating to techniques implementing multitenant computing infrastructure using a container orchestration system, such as the Kubernetes platform, are available in U.S. patent application Ser. No. 16/118,107, filed Aug. 30, 2018, entitled "MULTIPLE VIRTUAL NETWORK INTERFACE SUPPORT FOR VIRTUAL EXECUTION ELEMENTS,", the entire content of which is incorporated herein by reference.

Figure 2:
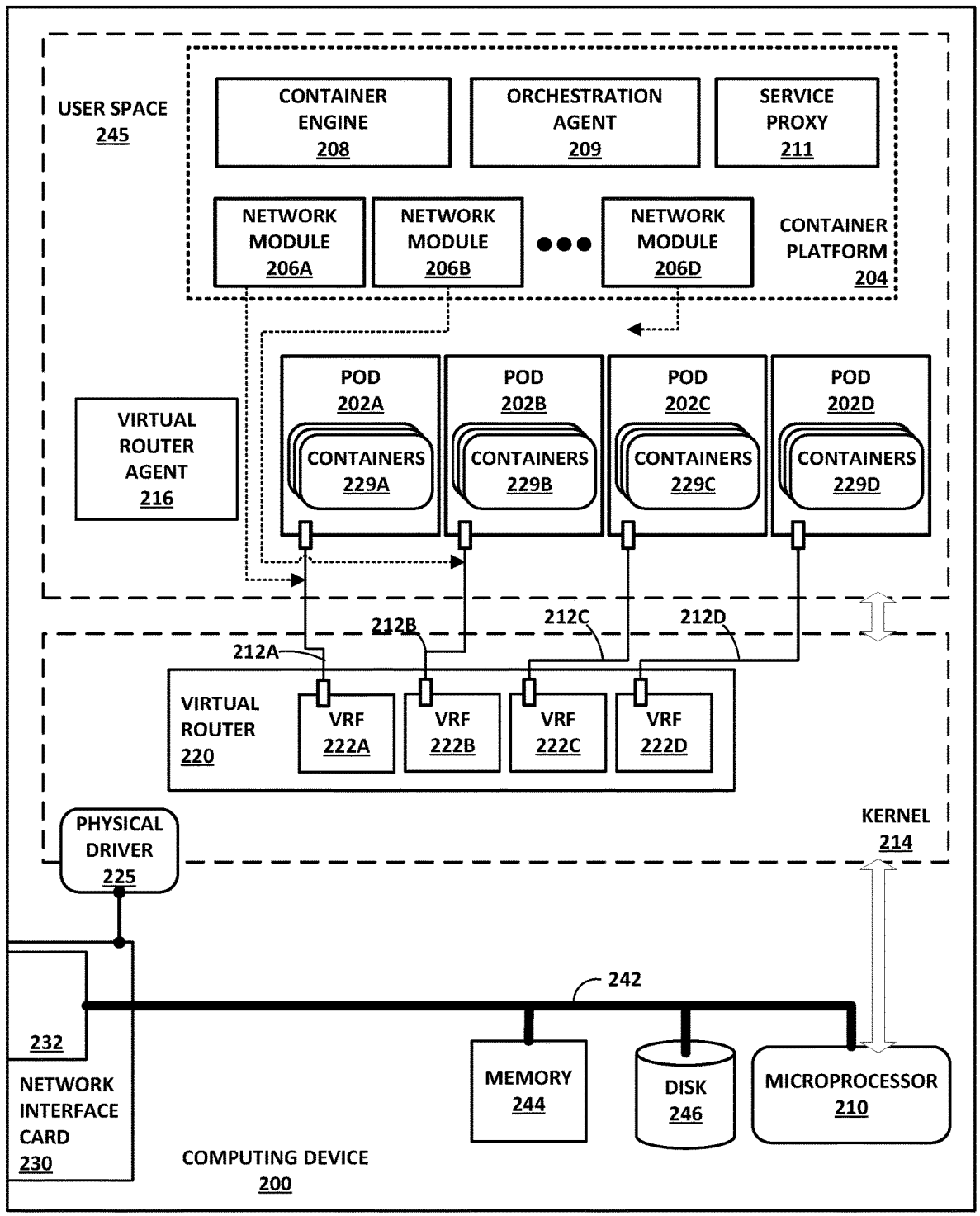
FIG. 2 is a block diagram of an example computing device that includes a network module for configuring multiple virtual network interfaces for a set of one or more virtual execution elements that share at least one virtual network interface, according to techniques described in this disclosure.

FIG. 2 is a block diagram of an example computing device (e.g., host) that includes a network module for configuring multiple virtual network interfaces for a set of one or more virtual execution elements that share at least one virtual network interface, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (WM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A through containers 229D or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In general, each of pods 202A-202D may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of an IP address of the computing device 200 on which the pod 202B resides. Similarly, Pods 202C and 202D may also be assigned its own virtual L3 IP address. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control or create virtual networks and configure network virtualization endpoints, such as computing device 200 and, more specifically, virtual router 220, as a well as virtual network interfaces 212 (corresponding to virtual network interfaces 212A through 212D). By configuring virtual router 220 based on information received from network controller 24, virtual router agent 216 may support configuring network isolation, policy-based security, a gateway, source network address translation (SNAT), a load-balancer, and service chaining capability for orchestration. In some cases, multiple pods 202 may have virtual interfaces 212 for a single VRF 222.

In one example, network packets, e.g., layer three (L3) IP packets or layer two (L2) Ethernet packets generated or consumed by containers 229A through containers 229D within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above in connection with FIG. 1C, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222D for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MIMS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to POD 202A in response.

Containers 229A through containers 229D may also source inner packets as source virtual network endpoints. One or more of containers 229A, for instance, may generate a layer 3 inner packet destined for a destination virtual network endpoint that is executed by another computing device (i.e., not computing device 200) or for another one of containers 229A-229D. Container 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using a physical function. NIC 230 outputs the packet on an outbound interface. If the destination is another virtual network endpoint executing on computing device 200, virtual router 220 routes the packet to the appropriate one of virtual network interfaces 212.

In some examples, a controller for computing device 200 (e.g., network controller 24 of FIG. 1) configures a default route in each of pods 202 to cause the pods 202 to use virtual router 220 as an initial next hop for outbound packets. In some examples, NIC 230 is configured with one or more forwarding rules to cause all packets received from pods 202 to be switched to virtual router 220.

Pods 202A-202D may represent example instances of pod 22A of FIG. 1C, in further detail. Pod 202A includes one or more containers 229A, pod 202B includes one or more containers 229B, pod 202C includes one or more containers 229C, and pod 202D includes one or more containers 229D.

Container platform 204 may represent an example instance of container platform 19A of FIG. 1, in further detail. Container platform 204 include container runtime 208, orchestration agent 209, service proxy 211, and network modules 206A-206D. Each of network modules 206A-206D may represent an example instance of network module 17A of FIG. 1, there being invoked one network module 206 per pod 202. In some cases, a network module 206 may configure virtual network interfaces for multiple pods 202.

Container engine 208 includes code executable by microprocessor 210. Container runtime 208 may be one or more computer processes. Container engine 208 runs containerized applications in the form of containers 229A-229D. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229D in pods 202A-202D.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200.

In some examples, one or more of pods 202 may be used to implement an object that uses an external IP address in a containerization platform. In one such example, pods 202 may be used to implement a Kubernetes service. To establish a Kubernetes service, two networks are typically used, one for the service, and one for the pods. The service network may be implemented with one or more pods 202 from computing device 200, and the pod network may be implemented with one or more different pods 202, also from computing device 200.

Accordingly, in one example, computing device 200 may be used to establish a Kubernetes service. For instance, in such an example, virtual router agent 216 receives, from network controller 24, instructions to configure virtual networks corresponding to a service network and a pod network. Virtual router agent 216 outputs to virtual router 220 information about the instructions. Virtual router 220 configures the service and pod networks, and for each virtual network, implements a VRF 222. In the example being described, pods 202A are used for providing computing infrastructure for the service network, and pods 202B are used for providing computing infrastructure for the pod network. Further, VRF 222A may be associated with the service network (which includes pods 202A), and VRF 222B may be associated with the pod network (which includes pods 202B). In some cases, each of VRFs 222 may be associated with multiple pods 202.

For the service network, virtual router 220 associates an external IP address with the service network and virtual network interface 212A. To implement the service, the floating or failover IP address is exposed as an external IP address for accessing the service. In some examples, the floating IP is drawn from a pool of namespace-level external IP addresses. In other examples, the floating or failover IP address may be drawn from a pool of external IP addresses allocated specifically for the service implemented by the service and pod networks. In either case, the pool of external IP addresses may be maintained by controller 5.

In a failover scenario, the external IP address allocated to a virtual execution element within pod 202A may be transferred to a different virtual execution element within pod 202A. For instance, with reference to FIG. 2, virtual router 220 may assign an external IP address to a first container 229A from the set of containers 229A. Virtual router 220 configures that first container 229A to respond to service requests for the Kubernetes service. That first container 229A responds to service requests by monitoring traffic sent to the external IP address. Should that first container 229A fail, virtual router 220 may transfer the external IP address to a different container from among the set of containers 229A (e.g., a "second container 229A"). Thereafter, the second container 229A responds to service requests by monitoring traffic sent to that same external IP address. In some examples, and upon failure of the first container 229A, virtual router 220 transfers the external IP address from the first container 229A to the second container 229A quickly and efficiently, with little or no service downtime.

Figure 3:
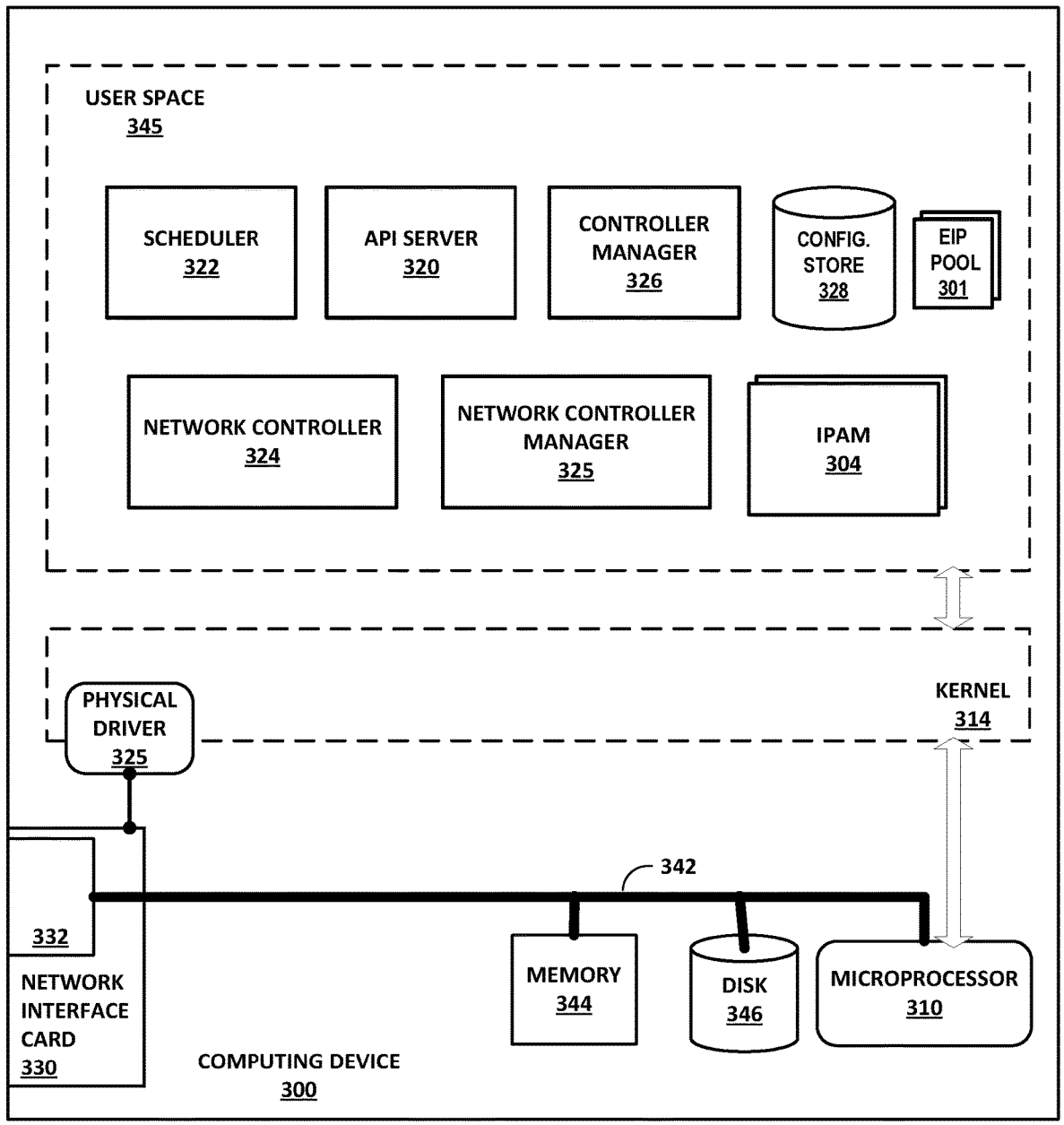
FIG. 3 is a block diagram of an example computing device operating as an instance of controller for a virtualized computing infrastructure, according to techniques described in this disclosure.

FIG. 3 is a block diagram of an example computing device operating as an instance of controller for a virtualized computing infrastructure. Computing device 300 an example instance of controller 5 for a virtualized computing infrastructure. Computing device 300 of FIG. 3 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may be a Kubernetes cluster and the master node may be a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

One or more IPAMs 304 each include code executable by microprocessor 310. Each of IPAMs 304 may be one or more computer processes. IPAM 304 may plan, allocate, and manage IP addresses used within each of a plurality of networks established by computing device 300 within infrastructure 8.

One or more external IP address pools 301 may represent data associated with one or more external IP address pools created through one of IPAMs 304 or otherwise. External IP address pools 301 may be created at the namespace level, or on a per-service or per-ingress basis. Although illustrated separately, one or more of external IP address pools 301 may be included within configuration store 328.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kube-proxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

Network controller manager 325 may be prompted to create one or more external IP address pools 301 having specific characteristics. For instance, in the example of FIG. 3, network controller manager 325 detects input that it determines corresponds to a request to establish an external IP pool. In some examples, the input may be in the form of an annotation. Network controller manager 325 determines that the request specifies that the external IP pool is to be established and isolated in a specific way. For example, network controller manager 325 may determine that the external IP address pool is to be isolated and/or established on a per-namespace, per-service, or per-ingress basis (e.g., isolated by namespace, service, or ingress).

Network controller manager 325 may create one or more external IP address pools 301. For instance, in such an example, and still referring to FIG. 3, network controller manager 325 outputs a request to one of IPAMs 304. One of IPAMs 304 determines the request corresponds to a request to establish one or more external IP address pools. IPAM 304 creates one or more external IP address pools 301 and stores information associated with each created external IP address pool 301 in configuration store 328. Network controller manager 325 uses the information stored within configuration store 328 to maintain and perform functions relating to the newly created external IP address pool 301. For example, network controller manager 325 may assign addresses from the newly-created external IP address pool 301 on a per-namespace, per-service, or per-ingress basis.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
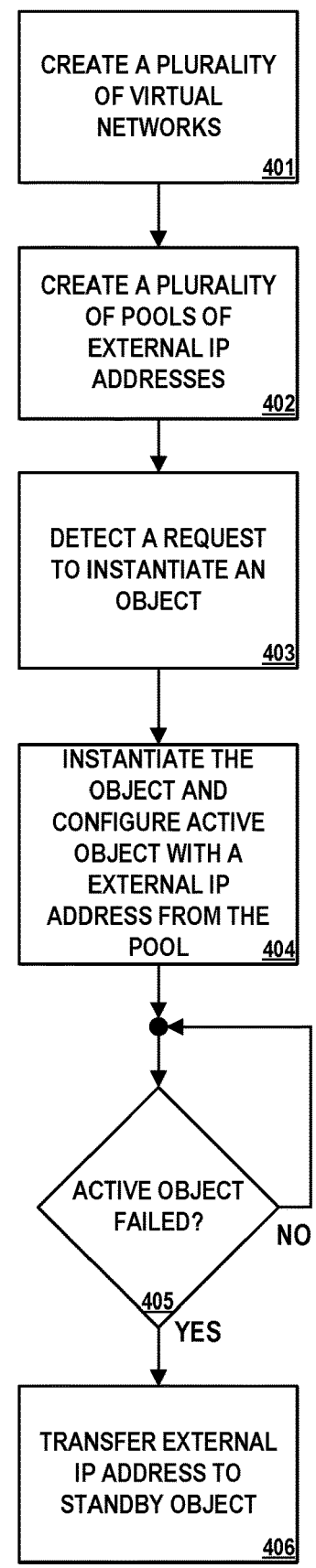
FIG. 4 is a flow diagram illustrating the example creation of multiple network virtual interfaces for a virtual execution element using a single network module, according to techniques described in this disclosure.

FIG. 4 is a flow diagram illustrating operations performed by an example controller 5 in accordance with one or more aspects of the present disclosure. FIG. 4 is described below within the context of controller 5 of FIG. 1A and/or FIG. 1B. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, controller 5 may create a plurality of virtual networks (401). For example, with reference to FIG. 1A, controller 5 creates networks 111A through 111N. Controller 5 configures each of the plurality of virtual networks so that each is isolated from each of the other virtual networks to prevent or limit access by any other of the plurality of tenants in the multitenant virtualized data center. In some examples, controller 5 creates a plurality of namespaces (e.g., namespaces 110A through 110N) and associates each of the virtual networks with a different namespace.

Controller 5 may create a plurality of pools of external IP addresses (402). For instance, still referring to FIG. 1A, controller 5 may create multiple pools of external IP addresses (e.g., external IP address pools 101A through 101N), where each of the pools is associated with a different one of the plurality of tenants. In some examples, the external IP addresses within each pool falls within a range of addresses that are associated with a range of addresses corresponding to that tenant's default network 111.

Controller 5 may detect a request to instantiate an object (403). For example, controller 5 detects a request to create a Kubernetes service. The request may identify a specific pool of external IP addresses from which the service is to draw an address for use as an external address for the service. In some examples, the request may specify the desired pool of external IP addresses through an annotation or other notation.

Controller 5 may instantiate the object (404). For example, continuing with the example being described, controller 5 creates a Kubernetes service, which may include both a service network and a pod network, each supported by one or more pods. Controller 5 configures an external access point for the service network with an external IP address drawn from the specified pool of external IP addresses.

Controller 5 may determine that the active object has failed (405). For instance, the active object, which may be servicing requests sent to the external IP address, may eventually fail. In such a scenario, controller 5 may follow a failover procedure that involves configuring a standby object (e.g., a different Kubernetes pod or container within the service network) with that same external IP address (406). Thereafter, the standby object services requests sent to the external IP address. In some examples, controller 5 may transfer the external IP address to the standby object with little or no downtime.

Figure 5:
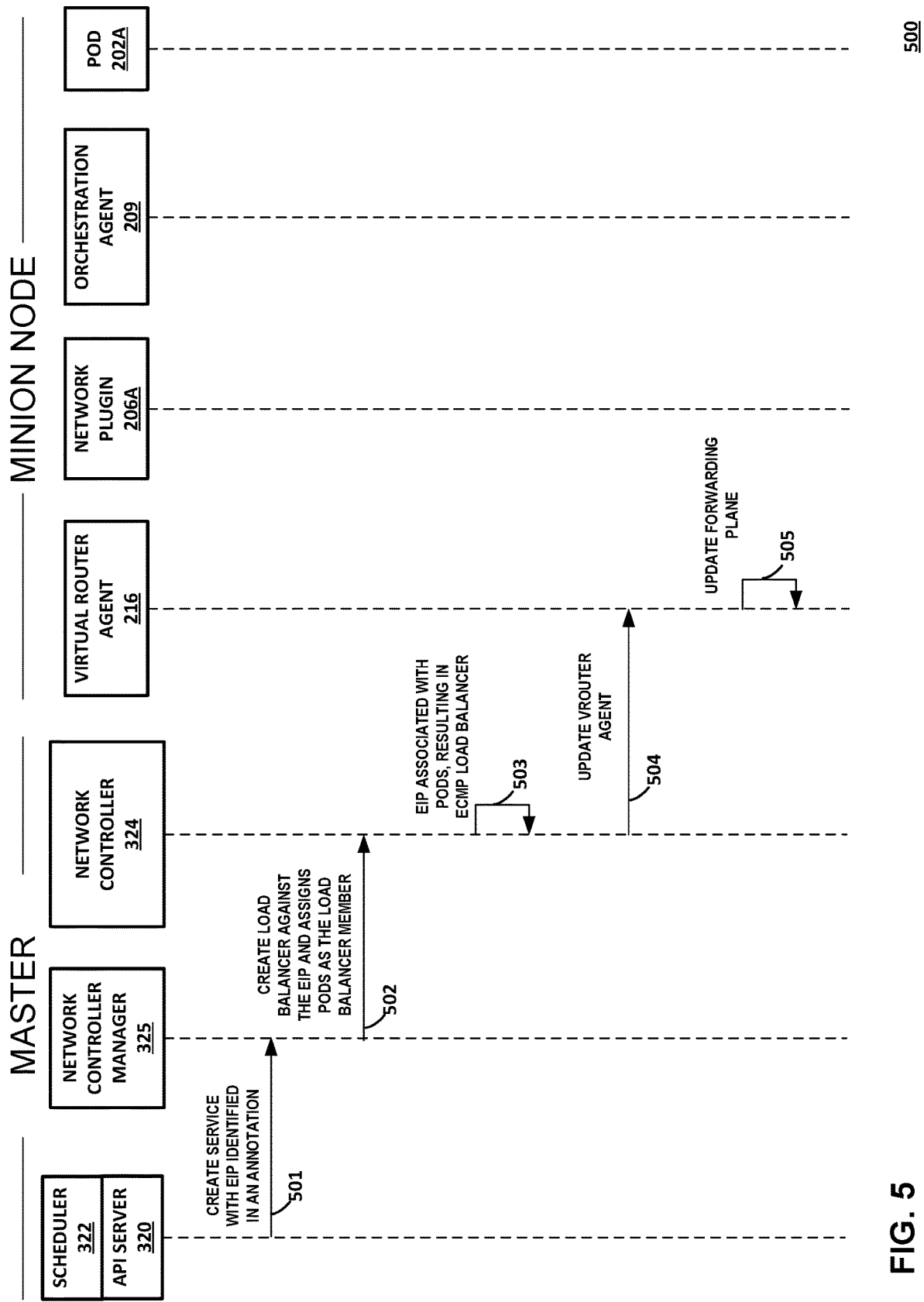
FIG. 5 is a flow diagram illustrating example process for creating a Kubernetes service using an external IP address drawn from an external IP address pool.

FIG. 5 is a flow diagram illustrating example process for creating a Kubernetes service or ingress using an external IP address drawn from an external IP address pool. For purposes of example, the operations are described in flow diagram 500 with respect to components of computing devices 200 and 300 of FIGS. 2-3.

API server 320 receives a request to instantiate and/or create a service (501). Although FIG. 5 describes creating a service, corresponding steps may be performed to create an ingress. The request, in the example illustrated, includes an annotation that identifies an external IP address pool. API server 320 modifies configuration store 328 and stores configuration information for creating the service. In some examples, the configuration information may include information about the external IP address pool identified in the annotation. Further, in some examples, scheduler 322 may select computing device 200 as the host minion node for the pod 202A.

Network controller manager 325 listens for new objects from API server 320 and determines that a service is to be established. In some examples, the listening may be in response to subscribing to API server 320 notifications on a RESTful interface. In the example illustrated, network controller 325 receives information from API server 320 about the external IP pool identified in the annotation. Network controller 325 identifies, based on the information about the annotation, an external IP pool. Network controller 325 directs network controller 324 to create a service/load balancer using an address from the identified external IP address pool. In the example illustrated, network controller 325 may also direct or cause network controller 324 to assign one or more pods (e.g., pod 202A) as the load balancer member (502). Network controller 324 associates the external IP address from the identified address pool with the pods, resulting, in some examples, in an ECMP load balancer (503).

Network controller 324 may send configuration information to the virtual router agent 216 for virtual router 220 of computing device 200 and thereby cause virtual router agent 216 to be updated with information associated with the service load balancer (504). Virtual router agent may store information about the service load balancer. Virtual router agent 216 may update the forwarding plane for the virtual router (505).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
creating, by a controller, in a virtualized computing infrastructure, a plurality of objects, wherein each of the objects is a namespace, and each is isolated from other objects to prevent access by any other object of the objects, and wherein each of the objects includes one or more pods of one or more containers;
creating, by the controller, a plurality of pools of floating IP addresses, each of the plurality of pools of floating IP addresses being associated with a different object of the objects, wherein each pool of floating IP addresses includes a range of addresses that are exclusive to the associated object;
configuring, by the controller, an active object of the objects with a floating IP address drawn from the pool of floating IP addresses associated with the active object, wherein the floating IP address is associated with a service provided by the active object;
servicing, by the active object, requests sent to the floating IP address;
determining, by the controller, that the active object has failed;
configuring, by the controller, a standby object with the floating IP address to thereby transfer the floating IP address to the standby object; and
servicing, by the standby object and after configuring the standby object with the floating IP address, requests sent to the floating IP address.

2. The method of claim 1, wherein each of the plurality of objects has respective virtual networks.

3. The method of claim 2, wherein associated with each of the virtual networks is an IP address management module, the method further comprising:
detecting, by the controller, a request to create a new pool of floating IP addresses for a specific network from among the plurality of virtual networks;
causing, by the controller, the IP address module associated with the specific network to generate a range of addresses; and
creating, by the controller, the new pool of floating IP addresses using the range of addresses.

4. The method of claim 2, wherein the virtualized computing infrastructure employs the Kubernetes container orchestration system, and wherein creating the plurality of virtual networks includes:

creating the plurality of virtual networks with Kubernetes pods serving as virtual network endpoints within the plurality of virtual networks, each of the Kubernetes pods including one or more containers colocated on a host device and serving as virtualized execution elements.

5. The method of claim 4, further comprising:
creating, by the controller and for the active object, a service network and a pod network to implement a Kubernetes service;
creating, by the controller, a new pool of floating IP addresses for use by the service network;
allocating, by the controller, a floating IP address from the new pool of floating IP addresses as an external address for the service network.

6. The method of claim 4, further comprising:
creating, by the controller and for each of the plurality of objects, a pool of floating IP addresses used for ingress.

7. The method of claim 1, wherein each of the objects is associated with a different one of a plurality of tenants.

8. The method of claim 1,
wherein creating the plurality of pools of floating IP addresses includes associating each of the plurality of pools of floating IP addresses with a different one of the plurality of objects.

9. The method of claim 1, wherein configuring the active object includes:
detecting a request to instantiate the active object, wherein the request identifies, through an annotation, the pool of floating IP addresses associated with the active object.

10. A method comprising:
creating, by a controller, a plurality of virtual networks, each of the plurality of virtual networks including a plurality of containerized virtual execution environments, with each of the plurality of virtual networks being associated with a different one of a plurality of tenants in a multitenant virtualized data center, and wherein each of the plurality of virtual networks is isolated from other virtual networks to prevent access by any other tenant of the plurality of tenants in the multitenant virtualized data center;
creating, by the controller, a plurality of pools of floating IP addresses, each of the plurality of pools of floating IP addresses being associated with a different one of the plurality of tenants, and wherein each of the floating IP addresses within each pool of floating IP addresses falls within a range of addresses that are exclusive to the tenant associated with that pool of floating IP addresses;
detecting, by the controller, a request to instantiate an object, wherein the object is an active object including one or more of the plurality of containerized virtual execution environments, and wherein the request identifies a specific pool from the plurality of pools of floating IP addresses;
instantiating, by the controller, the active object and configuring the active object with a floating IP address drawn from the specific pool;
servicing, by the active object, requests sent to the floating IP address;
determining, by the controller, that the active object has failed;
configuring, by the controller, a standby object with the floating IP address to thereby transfer the floating IP address to the standby object; and
servicing, by the standby object and after determining that the active object has failed, requests sent to the floating IP address.

11. A system comprising:
a storage device; and
processing circuitry having access to the storage device and configured to:
create, in a virtualized computing infrastructure, a plurality of namespaces, wherein each of the namespaces is isolated from other namespaces to prevent access by any other of the plurality of namespaces, and wherein each of the namespaces includes one or more pods of one or more containers;
create a plurality of pools of floating IP addresses, each of the pools of floating IP addresses within the plurality of pools being associated with a different namespace of the plurality of namespaces, and each including a range of addresses that are exclusive to the associated namespace;
create an active object within one of the namespaces of the plurality of namespaces, wherein the active object is isolated from objects in other namespaces to prevent access by the objects in the other namespaces;
create an additional pool of floating IP addresses, wherein the additional pool of floating IP addresses is associated with the active object and includes a range of addresses that are exclusive to the active object;
configure the active object with a floating IP address drawn from the additional pool of floating IP addresses;
service requests sent to the floating IP address;
determine that the active object has failed;
configure a standby object with the floating IP address to thereby transfer the floating IP address to the standby object; and
service, after determining that the active object has failed, requests sent to the floating IP address.

12. The system of claim 11,
wherein the active object is a service, and
wherein the floating IP address is associated with a service provided by the active object.

13. The system of claim 11,
wherein the active object is an ingress, and
wherein the floating IP address is associated with a ingress external IP address.

14. The system of claim 11, wherein to configure the active object, the processing circuitry is further configured to:
detect input identifying, through an annotation, the additional pool of floating IP addresses.

15. The system of claim 11, wherein the virtualized computing infrastructure employs the Kubernetes container orchestration system, and wherein the processing circuitry is further configured to:
create a plurality of virtual networks with Kubernetes pods serving as virtual network endpoints within the plurality of virtual networks, each of the Kubernetes pods including one or more containers colocated on a host device and serving as virtualized execution elements.

16. The system of claim 11, wherein the processing circuitry is further configured to:
create a service network and a pod network to implement a Kubernetes service;
create a new pool of floating IP addresses for use by the service network;

allocate a floating IP address from the new pool of floating IP addresses as an external address for the service network.

\* \* \* \* \*